United States Patent
Woeste et al.

(10) Patent No.: US 10,213,997 B2
(45) Date of Patent: Feb. 26, 2019

(54) WATER-VAPOUR PERMEABLE COMPOSITE PARTS

(71) Applicant: Covestro Deutschland AG, Leverkusen (DE)

(72) Inventors: Govert Woeste, Düsseldorf (DE); Markus Broich, Hückelhoven (DE)

(73) Assignee: Covestro Deutschland AG, Leverkusen (DE)

( * ) Notice: Subject to any disclaimer, the term of this patent is extended or adjusted under 35 U.S.C. 154(b) by 93 days.

(21) Appl. No.: 15/325,669

(22) PCT Filed: Jul. 6, 2015

(86) PCT No.: PCT/EP2015/065283
§ 371 (c)(1),
(2) Date: Jan. 11, 2017

(87) PCT Pub. No.: WO2016/005299
PCT Pub. Date: Jan. 14, 2016

(65) Prior Publication Data
US 2017/0157907 A1  Jun. 8, 2017

(30) Foreign Application Priority Data

Jul. 11, 2014  (EP) .................................... 14176657
Jan. 27, 2015  (EP) .................................... 15152634

(51) Int. Cl.
| | |
|---|---|
| B32B 27/08 | (2006.01) |
| B32B 27/40 | (2006.01) |
| E04B 1/62 | (2006.01) |
| C08G 18/32 | (2006.01) |
| C08G 18/34 | (2006.01) |
| C08G 18/48 | (2006.01) |
| C08G 18/76 | (2006.01) |
| C08G 18/60 | (2006.01) |
| C08G 18/08 | (2006.01) |
| E04D 12/00 | (2006.01) |

(52) U.S. Cl.
CPC .............. *B32B 27/40* (2013.01); *B32B 27/08* (2013.01); *C08G 18/0823* (2013.01); *C08G 18/3206* (2013.01); *C08G 18/348* (2013.01); *C08G 18/4845* (2013.01); *C08G 18/603* (2013.01); *C08G 18/7671* (2013.01); *E04B 1/625* (2013.01); *E04D 12/002* (2013.01); *B32B 2307/724* (2013.01)

(58) Field of Classification Search
CPC ... B32B 2307/724; B32B 27/08; B32B 27/40; C08G 18/0823; C08G 18/3206; C08G 18/348; C08G 18/4845; C08G 18/603; C08G 18/7671; E04B 1/625; E04D 12/002
USPC ......................................... 428/424.8; 528/85
See application file for complete search history.

(56) References Cited

U.S. PATENT DOCUMENTS

| | | | | |
|---|---|---|---|---|
| 5,840,812 A | * | 11/1998 | Schultze .................... | C08J 5/18 525/458 |
| 2003/0134085 A1 | | 7/2003 | Haas et al. | |
| 2004/0122202 A1 | * | 6/2004 | Meltzer .............. | C08G 18/1825 528/53 |
| 2008/0206513 A1 | * | 8/2008 | Malz ....................... | B29C 44/12 428/95 |
| 2008/0280134 A1 | | 11/2008 | Kelba et al. | |

FOREIGN PATENT DOCUMENTS

| | | |
|---|---|---|
| CA | 2280790 A1 | 8/1998 |
| DE | 19706380 A1 | 8/1998 |
| DE | 102005012796 A1 | 9/2006 |
| EP | 1319503 A1 | 6/2003 |

OTHER PUBLICATIONS

International Search Report and Written Opinion for International Application No. PCT/EP2015/065283, European Patent Office, dated Oct. 8, 2015.

\* cited by examiner

*Primary Examiner* — Thao T Tran
(74) *Attorney, Agent, or Firm* — K&L Gates LLP

(57) ABSTRACT

The invention relates to water-vapor permeable, flat composite parts consisting of at least two layers, at least one layer being made of a polyester and polyether-based thermoplastic polyurethane. The invention also related to the use thereof.

18 Claims, No Drawings

WATER-VAPOUR PERMEABLE COMPOSITE PARTS

CROSS-REFERENCE TO RELATED APPLICATIONS

This application is a U.S. national stage application, filed under 35 U.S.C. § 371, of PCT/EP2015/065283, which was filed on Jul. 6, 2015, and which claims priority to European Patent Application No. EP 14176657.6, filed Jul. 11, 2014, and European Patent Application No. EP 15152634.0, filed Jan. 27, 2015, the contents of which are incorporated by reference into this specification.

FIELD

The invention relates to water vapour-permeable flat composite components consisting of at least two layers, wherein at least one layer consists of a polyester- and polyether-based thermoplastic polyurethane, and to the use thereof.

BACKGROUND

Thermoplastic polyurethane elastomers (TPUs) are of industrial significance, since they exhibit excellent mechanical properties and can be processed by thermoplastic means inexpensively. Through the use of different chemical formation components, it is possible to vary their mechanical properties over a wide range. Comprehensive descriptions of TPUs, and the properties and uses thereof, can be found in Kunststoffe 68 (1978), p. 819-825 and Kautschuk, Gummi, Kunststoffe 35 (1982), p. 568-584.

TPUs are formed from linear polyols, usually polyester or polyether polyols, organic diisocyanates and short-chain diols (chain extenders). The formation reaction can be accelerated by additionally adding catalysts. The molar ratios of the formation components can be varied over a wide range, which allows the properties of the product to be adjusted. According to the molar ratios of polyols to chain extenders, products are obtained over a wide Shore hardness range. The thermoplastically processible polyurethane elastomers can be formed either stepwise (prepolymer method) or through the simultaneous reaction of all the components in one stage (one-shot method). In the prepolymer method, the polyol and diisocyanate are used to form an isocyanate-containing prepolymer which is reacted in a second step with the chain extender. The TPUs can be prepared continuously or batchwise. The best-known industrial production methods are the belt method and the extruder method.

As well as catalysts, auxiliaries and additives can also be added to the TPU formation components.

Particularly in the textile industry and in the construction industry, TPUs are used in the form of extruded films. In conjunction with textile layers or web-like fabrics, they find use in weather-resistant items of clothing, tarpaulins, roofing underlayment or exterior underlayment (composite components). The task of the TPU here in each case is firstly to act as a barrier to water in liquid form (e.g. rain) and secondly to release water in the gaseous state from the interior to the exterior, in order to obtain the most pleasant interior conditions possible. In contrast to other materials, TPU can fulfil this double function without production of micropores in the TPU layer.

Factors of crucial significance, as well as good water vapour permeability of such composite components and hence of the TPU layer, are both minimum swelling and adequate mechanical properties of the TPU films used in the composite component. An excessive tendency of the TPU film to swell increases the risk that the TPU film will become detached from the other layers that form part of the composite (e.g. the web), also called the substructure. As a result of this detachment, the usually very thin TPU films/layers are additionally exposed to the risk of damage in the form of cracks, for example. In addition, inadequate mechanical properties of the TPU film used not only make them more difficult to process to give the composite component, but likewise increase the risk of damage and lead to perceptible losses in the functionality of the components.

EP-A 1937743 describes TPUs having 30%-55% by weight of hard segment (diisocyanate and chain extender) and 45%-70% by weight of soft segment. The soft segment here comprises 20%-80% by weight of polyester diol and 20%-80% by weight of poly(oxypropylene)poly(oxyethylene) glycol-polyether diol, wherein the content of oxyethylene groups is less than 25% by weight of the polyether diol. The oxyethylene group content based on the totality of the polyols (soft segment) is thus below 20% by weight. Water vapour permeability is inadequate.

US-A 2008/0269454 discloses TPUs formed from diphenylmethane 4,4'-diisocyanate, 20%-60% by weight of hydrophilic polyether polyols comprising polyethylene glycol, polypropylene glycol or polytetramethylene glycol, having a carbon/oxygen ratio of 2:1 to 2.4:1, and 10%-40% by weight of aliphatic polyester polyols, some of which have good water vapour permeability and good processibility to films. However, the TPUs described here swell, or water vapour permeability is inadequate. In some cases, the raw material costs are also too high.

EP-A 1599522 is concerned with TPUs formed from a polyisocyanate, a symmetric chain extender, a further chain extender having a proportion in the total amount of chain extender of 1-50 mol % and having a molar ratio to the percentage by weight of the polyether polyol of 0.1 to 10, a polyester polyol and 1%-50% by weight, based on the total amount of polyol, of a polyether-co-polyol comprising polytetramethylene ether glycol, polypropylene oxide, poly(propylene oxide-co-ethylene oxide), polyethylene oxide or combinations thereof. The TPUs have the disadvantage of being subject to swelling, having a low water vapour permeability or having high raw material costs.

U.S. Pat. No. 3,493,634 describes TPUs formed from an aromatic diisocyanate and a mixture of 60-85 parts polyester, 15-40 parts poly(alkylene oxide) and 1.25-12.8 mol, based on one mole of polyester and poly(alkylene oxide), of an aliphatic glycol containing 2-12 carbon atoms. The mixture of polyester, poly(alkylene oxide) and glycol is to have a mean molecular weight of 300-450. The TPUs exhibit improved injection mouldability. However, the TPUs have the disadvantage of either having a low water vapour permeability or having high raw material costs.

U.S. Pat. No. 4,124,572 discloses TPUs formed from a poly(oxypropylene)-poly(oxyethylene) glycol containing 25%-60% by weight of oxyethylene groups, a polyester polyol, a polyisocyanate from the group consisting of toluene 2,4-diisocyanate, methylenebis(4-phenyl isocyanate), 4,4'-diisocyanatodicyclohexylmethane and isophorone diisocyanate, and also a chain extender, where the molar ratio of the chain extender to poly(oxypropylene)-poly(oxyethylene) glycol and polyester polyol is 3:1 to 10:1 and where the weight ratio of the poly(oxypropylene)-poly(oxyethylene) glycol to the polyester polyol is 10/90 to 90/10. The TPUs thus obtained, according to the description, have good mechanical and elastic properties, good thermal stability and colourability, and also good processing and low costs. However, the water vapour permeability thereof is poor.

SUMMARY

The problem addressed was that of providing a flat composite component composed of at least two layers, of which at least one consists of TPU, wherein the TPU layer is based on comparatively inexpensive raw materials having sufficient reactivity for simple processibility to give a TPU layer, and wherein the TPU layer and hence the composite component has a high water vapour permeability with simultaneously low swelling and adequate mechanical properties.

This problem was solved by using, as TPU layer in the composite component, a TPU based on a mixture of polyether polyols and polyester polyols. In this mixture, a particular content of oxyethylene units has to be observed and, in addition, a particular ratio between the TPU hard segment phase and the TPU soft segment phase, defined via the molar ratio of chain extender (component B) to polyol (component C and component D), has to be established.

DETAILED DESCRIPTION

The invention provides water vapour-permeable flat composite components consisting of at least one layer (i) not consisting of thermoplastic polyurethane, at least one layer (ii) composed of polyether polyol- and polyester polyol-based thermoplastic polyurethane and optionally further layers (iii) composed of thermoplastic polyurethane that do not directly adjoin the layer (ii) with a flat join, where the layer (ii) consists of a thermoplastic polyurethane obtainable from the reaction of the components consisting of
A) at least one organic diisocyanate,
B) at least one component having two hydroxyl groups and in each case having a number-average molecular weight of 60 to 490 g/mol as chain extender,
C) a component consisting of one or more polyether polyols each having a number-average molecular weight of 500-5000 g/mol, of which at least one polyether polyol (C1) contains ethylene oxide units,
D) 10% to 85% by weight, based on the total amount of C) and D), of one or more aliphatic polyester polyols each having a number-average molecular weight of 500-5000 g/mol,
in the presence of
E) optionally catalysts,
F) optionally assistants and/or additives,
where the molar ratio of the NCO groups in A) to the isocyanate-reactive groups in B), C) and D) is 0.9:1 to 1.2:1, characterized in that the total content of ethylene oxide units in component C) is at least 5% and not more than 45% by weight, based on the total weight of components C) and D), and the number-average functionality of the sum total of all the polyols in C) and D) is 1.8 to 2.5, and the content of ethylene oxide units (X in % by weight) in component C), relative to the molar ratio Y of chain extenders B) to the sum total of components C) and D), is below the value of X which arises from the formula X (% by weight)=7.35*Y+ 13.75.

The TPUs used in accordance with the invention in layer (ii) surprisingly have very good water vapour permeabilities with simultaneously extremely low swelling, and additionally have sufficiently good mechanical properties, such that it is possible to provide the inventive composite components.

Useful organic diisocyanates A) preferably include aliphatic, cycloaliphatic, araliphatic, heterocyclic and aromatic diisocyanates, as described in Justus Liebigs Annalen der Chemie, 562, p. 75-136.

Specific examples include: aliphatic diisocyanates such as hexamethylene 1,6-diisocyanate, cycloaliphatic diisocyanates such as isophorone diisocyanate, cyclohexane 1,4-diisocyanate, 1-methylcyclohexane 2,4-diisocyanate and 1-methylcyclohexane 2,6-diisocyanate and the corresponding isomer mixtures, dicyclohexylmethane 4,4'-diisocyanate, dicyclohexylmethane 2,4'-diisocyanate and dicyclohexylmethane 2,2'-diisocyanate and the corresponding isomer mixtures, aromatic diisocyanates such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates and diphenylmethane 2,4'-diisocyanates, 4,4'-diisocyanato-1,2-diphenylethane and naphthylene 1,5-diisocyanate. Preference is given to using hexamethylene 1,6-diisocyanate, isophorone diisocyanate, dicyclohexylmethane 4,4'-diisocyanate, naphthylene 1,5-diisocyanate and diphenylmethane diisocyanate isomer mixtures having a diphenylmethane 4,4'-diisocyanate content of >96% by weight and especially diphenylmethane 4,4'-diisocyanate and hexamethylene 1,6-diisocyanate. These diisocyanates can be used individually or in the form of mixtures with one another. They can also be used together with up to 15% by weight (based on the total amount of diisocyanate) of a polyisocyanate, for example triphenylmethane 4,4',4"-triisocyanate or polyphenylpolymethylene polyisocyanates.

Chain extenders B) used are one or more diols having a number-average molecular weight of 60 to 490 g/mol, preferably aliphatic diols having preferably 2 to 14 carbon atoms, for example ethanediol, propane-1,2-diol, propane-1,3-diol, butanediol, hexanediol, diethylene glycol, dipropylene glycol, especially aliphatic diols having preferably 2 to 8 carbon atoms, preferably butane-1,4-diol and hexane-1,6-diol. Also suitable, however, are diesters of terephthalic acid with glycols having 2 to 4 carbon atoms, for example ethylene glycol bisterephthalate or butane-1,4-diol bisterephthalate, hydroxyalkylene ethers of hydroquinone, for example 1,4-di(beta-hydroxyethyl)hydroquinone and ethoxylated bisphenols, for example 1,4-di(beta-hydroxyethyl)bisphenol A. It is also possible to use mixtures of the abovementioned chain extenders, especially two different, more preferably aliphatic, chain extenders, especially butane-1,4-diol and hexane-1,6-diol. In addition, it is also possible to add relatively small amounts of triols.

Suitable polyether polyols for component C) can be prepared by reacting one or more alkylene oxides having 2 to 4 carbon atoms in the alkylene radical with a starter molecule containing two active hydrogen atoms in bound form. Examples of alkylene oxide include: ethylene oxide, 1,2-propylene oxide, epichlorohydrin and 1,2-butylene oxide and 2,3-butylene oxide. The alkylene oxides can be used individually, in alternating succession or as mixtures. Examples of useful starter molecules include: water, amino alcohols such as N-alkyldiethanolamines, for example N-methyldiethanolamine, and diols such as ethylene glycol, 1,3-propylene glycol, butane-1,4-diol and hexane-1,6-diol. It is optionally also possible to use mixtures of starter molecules. Suitable polyether polyols are additionally the hydroxyl-containing polymerization products of propane-1, 3-diol and tetrahydrofuran. It is also possible to use trifunctional polyethers, but at most in such an amount as to form a thermoplastically processible product and such that the number-average functionality of the sum total of all the polyether polyols in C) and D) is 1.8 to 2.5. The preferably essentially linear polyether polyols have number-average molecular weights of 500 to 5000 g/mol. The polyether polyols can be used either individually or in the form of mixtures with one another. In a particularly preferred execution, the polyether polyol used is not a poly(tetramethylene glycol).

Component C) contains at least one polyether polyol C1) containing ethylene oxide units (—(O—CH$_2$—CH$_2$—)— units, also referred to as oxyethylene units). The content of ethylene oxide units in component C) is at least 5% and not more than 45% by weight, preferably 21% to 45% by weight, more preferably 21% to 33% by weight, based on the total weight of components C) and D), and the content of ethylene oxide units (X in % by weight) in component C), relative to the molar ratio Y of chain extenders B) to the sum total of components C) and D), is below the value of X which arises from the formula X (% by weight)=7.35*Y+ 13.75.

Preference is given to using, as polyether polyols C1) containing ethylene oxide units, aliphatic polyether polyols formed from ethylene oxide units and from propylene oxide units (—(O—CH(CH$_3$)—CH$_2$—)— and/or (—(O—CH$_2$—CH$_2$—CH$_2$—)— units, also referred to as oxypropylene units), the number-average molecular weights of which are preferably 1800 to 3000 g/mol. More particularly, the polyether polyols formed from ethylene oxide units and propylene oxide units used are those which contain 30% to 99% by weight of ethylene oxide units and 1% to 70% by weight of propylene oxide units, preferably 35% to 99% by weight of ethylene oxide units and 1% to 65% by weight of propylene oxide units, more preferably 35% to 55% by weight of ethylene oxide units and 45% to 65% by weight of propylene oxide units. In addition, particular preference is given to the polyether polyols which are formed from ethylene oxide units and propylene oxide units and have 1% to 75%, especially 50% to 75%, primary hydroxyl end groups. At least one of the polyether polyols C1) containing ethylene oxide units in component C) is preferably one or more components from the group consisting of poly(ethylene glycol), a copolymer of ethylene oxide units and 1,2-propylene oxide units, a copolymer of ethylene oxide units and 1,3-propylene oxide units, a copolymer of ethylene oxide units and 1,3-propylene oxide units and 1,2-propylene oxide units. In a particularly preferred execution, the polyether polyols C1) formed from ethylene oxide units and propylene oxide units are not in the form of block copolymers. The polyether polyols C1) formed from ethylene oxide units and propylene oxide units may be employed individually or else in the form of mixtures with one another or else in a mixture with one or more preferably aliphatic polyether polyols, preferably from the group consisting of poly(ethylene glycol), poly(1,2-propylene glycol) and poly(1,3-propylene glycol). In addition, it is also possible to use mixtures of poly(ethylene glycol) with one or more preferably aliphatic polyether polyols, preferably from the group consisting of poly(1,2-propylene glycol) and poly(1,3-propylene glycol).

Component C) is preferably a component mixture from the group consisting of poly(ethylene glycol) and poly(1,2-propylene glycol), of poly(ethylene glycol) and poly(1,3-propylene glycol), of poly(ethylene glycol) and poly(1,3-propylene glycol) and poly(1,2-propylene glycol), poly (ethylene glycol) and a polyol formed from ethylene oxide units and from propylene oxide units, of poly(1,2-propylene glycol) and a polyol formed from ethylene oxide units and from propylene oxide units, of poly(1,3-propylene glycol) and a polyol formed from ethylene oxide units and from propylene oxide units, of poly(ethylene glycol) and poly(1, 2-propylene glycol) and a polyol formed from ethylene oxide units and from propylene oxide units, of poly(ethylene glycol) and poly(1,3-propylene glycol) and a polyol formed from ethylene oxide units and from propylene oxide units, of poly(ethylene glycol) and poly(1,3-propylene glycol) and poly(1,2-propylene glycol) and a polyol formed from ethylene oxide units and from propylene oxide units.

TPUs which contain component C) described in the preceding paragraphs have very good water vapour permeabilities with simultaneously extremely low swelling, and additionally have sufficiently good mechanical properties.

Suitable aliphatic polyester polyols D) can be prepared, for example, from dicarboxylic acids having 2 to 12 carbon atoms, preferably 4 to 6 carbon atoms, and polyhydric alcohols. Examples of useful dicarboxylic acids include: aliphatic dicarboxylic acids such as succinic acid, glutaric acid, adipic acid, suberic acid, azelaic acid and sebacic acid. The dicarboxylic acids can be used individually or as mixtures, for example in the form of a succinic acid, glutaric acid and adipic acid mixture. For preparation of the polyester polyols, it may in some cases be advantageous to use, rather than the dicarboxylic acids, the corresponding dicarboxylic acid derivatives such as carboxylic diesters having 1 to 4 carbon atoms in the alcohol radical, carboxylic anhydrides or carbonyl chlorides. Examples of polyhydric alcohols are glycols having 2 to 10 and preferably 2 to 6 carbon atoms, such as ethylene glycol, diethylene glycol, butane-1,4-diol, pentane-1,5-diol, hexane-1,6-diol, decane-1,10-diol, 2,2-dimethylpropane-1,3-diol, propane-1,3-diol and dipropylene glycol. According to the desired properties, the polyhydric alcohols may be used alone or optionally in a mixture with one another. Also suitable are esters of carbonic acid with the diols mentioned, especially those having 4 to 6 carbon atoms, such as butane-1,4-diol or hexane-1,6-diol, condensation products of hydroxycarboxylic acids, for example hydroxycaproic acid, and polymerization products of lactones, for example optionally substituted caprolactones. Polyester polyols used with preference are ethanediol polyadipate, butane-1,4-diol polyadipate, ethanediol butane-1,4-diol polyadipate, hexane-1,6-diol neopentyl glycol polyadipate, hexane-1,6-diol butane-1,4-diol polyadipate and polycaprolactones. The polyester polyols have number-average molecular weights of 500 to 5000 g/mol and can be used individually or in the form of mixtures with one another. The aliphatic polyester polyols are used in an amount of 10% to 85% by weight, preferably in an amount of 10% to 55% by weight, based on the total amount of C) and D).

The molar ratio between the chain extender B) on the one hand and the sum total of the polyols C) and D) on the other hand is preferably 0.68:1 to 2.95:1.

Suitable catalysts E) for TPU production may be the customary tertiary amines known according to the prior art, for example triethylamine, dimethylcyclohexylamine, N-methylmorpholine, N,N'-dimethylpiperazine, 2-(dimethylaminoethoxy)ethanol, diazabicyclo[2.2.2]octane, and preferably organic metal compounds, for example titanic esters, iron compounds, tin compounds, for example tin diacetate, tin dioctoate, tin dilaurate or the dialkyltin salts of aliphatic carboxylic acids, for example dibutyltin diacetate, dibutyltin dilaurate. Particularly preferred catalysts are organic metal compounds, especially titanic esters, iron compounds or tin compounds.

As well as the TPU components and the catalysts, it is also possible to add other auxiliaries and/or additives F). Examples include silicone compounds, antiblocking agents, inhibitors, stabilizers against hydrolysis, light, heat and discolouration, flame retardants, dyes, pigments, inorganic or organic fillers and reinforcers. Reinforcers are especially fibrous reinforcing materials such as inorganic fibres, which are produced according to the prior art and may also be sized. Further details of the auxiliaries and additives mentioned can be found in the specialist literature, for example J. H. Saunders, K. C. Frisch: "High Polymers", volume XVI, Polyurethanes, parts 1 and 2, Interscience Publishers 1962 and 1964, R. Gächter, H. Müller (eds.): Taschenbuch der Kunststoff-Additive [Handbook of Plastics Additives], 3rd edition, Hanser Verlag, Munich 1989, or DE-A 29 01 774.

Also suitable for incorporation are standard plasticizers such as phosphates, adipates, sebacates and alkylsulphonic esters.

It is likewise possible to use small amounts of customary monofunctional compounds as well, for example as chain terminators or demoulding aids. Examples include alcohols such as octanol and stearyl alcohol or amines such as butylamine and stearylamine.

For preparation of the TPUs in layer (ii), the formation components can be reacted, optionally in the presence of catalysts, auxiliaries and additives, in such amounts that the equivalents ratio of NCO groups to the sum total of the NCO-reactive groups, especially the OH groups of the low molecular weight diols/triols and polyols, is 0.9:1.0 to 1.2:1.0, preferably 0.95:1.0 to 1.10:1.0.

Further water vapour-permeable layer(s) (i) used in the composite component are preferably layers of textiles, nonwovens, thermoplastic polymers, excluding thermoplastic polyurethane, for example polyethylene, polypropylene, fluorinated polyolefins, polyesters and polyamides, paper or cardboard or metal meshes. Water vapour-permeable layers are understood to mean both layers having mechanically produced holes through which the water vapour can penetrate and layers having intrinsic water vapour permeability. Particular preference is given to using nonwovens or textiles. The layers (i) may be disposed on one or both sides of the TPU layer (ii).

The TPUs used for the layer (ii) may be produced continuously in what is called an extruder method, for example in a multi-shaft extruder. The TPU components A), B), C) and D) can be metered in simultaneously, i.e. in a one-shot method, or successively, i.e. by a prepolymer method. The prepolymer can either be initially charged batchwise or produced continuously in a portion of the extruder or in a separate upstream prepolymer unit.

The polyether polyol- and polyester polyol-based TPUs used can be used to produce films and foils and also coatings having great homogeneity from the melt as layer (ii). The composite components according to the invention can be used as roofing underlayment and exterior underlayment.

The invention is to be illustrated in more detail by the examples which follow.

Examples

TPU Preparation

A reaction vessel was initially charged with the respective polyol with a temperature of 200° C., in which there had been dissolved, based on the total weight of all the feedstocks, 0.1% to 0.36% by weight of Carbodiimide ILF (Bayer MaterialScience AG, Leverkusen, DE), 0.1% to 0.88% by weight of Irganox® 1010 (manufacturer: BASF SE, Ludwigshafen, DE), optionally 0.03% to 0.09% by weight of Irgafos® PEPQ (BASF SE, Ludwigshafen, DE), 0% to 0.01% by weight of KL3-2049 (thermal stabilizer; Bayer MaterialScience AG, Leverkusen, DE) and 0.8% to 0.83% by weight of Licolub® FA6 (manufacturer: Clariant, Gersthofen, DE) or Loxamid® 3324 (Cognis Oleochemicals GmbH, Düsseldorf, DE). Then butane-1,4-diol (BDO) and hexane-1,6-diol (HDO), a sufficient amount of diphenylmethane 4,4'-diisocyanate (MDI) at 60° C. that the index was 0.995 and 10 to 14 ppm of titanium acetylacetonate as catalyst were added while stirring, and the complete reaction mixture was stirred vigorously for 10 to 25 seconds. Subsequently, the viscous reaction mixture was poured onto a coated metal sheet and heat-treated at 80° C. for a further 30 minutes. The cast sheets obtained were cut and pelletized.

Raw materials used:

Polyol A Polyether L5050 (OH number: 55.9-57.2 mg KOH/g, 1,2-propylene glycol-started bifunctional polyether formed from ethylene oxide and propylene oxide with an ethylene oxide cap (about 10% by weight), an ethylene oxide content of about 50% by weight and with 60%-70% primary hydroxyl end groups); Bayer MaterialScience AG, Leverkusen, DE Polyol B Acclaim® Polyol 2200 N (OH number: 56.1 mg KOH/g, poly(1,2-propylene glycol)); Bayer MaterialScience AG, Leverkusen, DE Polyol C Polyether PW56 (OH number: 56.7 mg KOH/g, poly(ethylene glycol)); Bayer MaterialScience AG, Leverkusen, DE Polyol D Polyester PE 225B (OH number: 50-50.9 mg KOH/g, poly(1,4-butanediol adipate)); Bayer MaterialScience AG, Leverkusen, DE Polyol E Polyester PE 90B (OH number: 117.7-120.7 mg KOH/g, poly(1,4-butanediol adipate)); Bayer MaterialScience AG, Leverkusen, DE Polyol F Desmophen® 2002H (OH number: 54.7-57.6 mg KOH/g, poly(ethanediol adipate-co-butane-1,4-diol adipate)); Bayer MaterialScience AG, Leverkusen, DE MDI Desmodur® 44 M (diphenylmethane 4,4'-diisocyanate); Bayer MaterialScience AG, Leverkusen, DE BDO butane-1,4-diol; BASF SE, Ludwigshafen, DE HDO hexane-1,6-diol; Lanxess, Uerdingen, DE

TABLE 1

Preparation of TPUs

| TPU | Polyether polyol | Polyether polyol [pts. by wt.] | Polyester polyol | Polyester polyol [pts. by wt.] | BDO [pts. by wt.] | HDO [pts. by wt.] | MDI [pts. by wt.] |
|---|---|---|---|---|---|---|---|
| 1* | B | 30.5 | D/E | 24.4/6.1 | 7.2 | 0.8 | 29.7 |
| 2 | A | 27.3 | D/E | 28.5/6.1 | 6.9 | 0.8 | 29.1 |

TABLE 1-continued

Preparation of TPUs

| TPU | Polyether polyol | Polyether polyol [pts. by wt.] | Polyester polyol | Polyester polyol [pts. by wt.] | BDO [pts. by wt.] | HDO [pts. by wt.] | MDI [pts. by wt.] |
|---|---|---|---|---|---|---|---|
| 3 | A | 33.5 | D/E | 23.5/5.1 | 6.9 | 0.8 | 29.1 |
| 4* | C | 31 | D/E | 24.8/6.2 | 6.9 | 0.8 | 29.1 |
| 5 | A | 20.7 | D/E | 32.9/7.4 | 7.2 | 0.8 | 29.7 |
| 6 | A | 26.9 | D/E | 27.9/6.2 | 7.2 | 0.8 | 29.7 |
| 7* | A | 38.6 | D/E | 21.5/4.2 | 6.1 | 0.8 | 27 |
| 8 | A | 36 | D/E | 20.1/3.9 | 7.4 | 0.8 | 30 |
| 9* | A | 45.3 | F | 19.4 | 6.1 | 0.8 | 26.7 |
| 10 | A | 41.8 | F | 17.9 | 7.5 | 0.7 | 29.9 |
| 11 | A | 32.1 | D/E | 26.8/5.3 | 6.1 | 0.8 | 27 |
| 12* | A | 41.7 | D/E | 14.8/3 | 7.5 | 0.8 | 30.2 |
| 13* | A | 47.8 | D/E | 9.9/2 | 7.6 | 0.8 | 30.2 |
| 14* | A | 42 | D/E | 15.2/3 | 7.4 | 0.8 | 30 |
| 15 | A | 41.8 | F | 17.9 | 7.5 | 0.7 | 29.9 |
| 16* | A | 48 | F | 12 | 7.6 | 0.8 | 30 |
| 17* | C | 14.2 | D/E | 37.8/7.2 | 7.5 | 0.8 | 30.4 |
| 18* | C | 16.6 | D/E | 35.9/6.9 | 7.5 | 0.8 | 30.4 |
| 19 | A | 33 | D/E | 23/5.1 | 7.2 | 0.8 | 29.6 |
| 20 | A | 31.2 | D/E | 26.1/5.1 | 6.6 | 0.8 | 28.3 |
| 21 | A | 29.3 | D/E | 29.9/5.9 | 5.8 | 0.9 | 26.4 |
| 22 | A | 34.9 | D/E | 23.9/4.7 | 6.3 | 0.8 | 27.6 |
| 23 | A | 34.9 | D/E | 23.9/4.7 | 6.3 | 0.8 | 27.6 |
| 24* | A | 48.8 | D/E | 10.1/2.1 | 7.2 | 0.8 | 29.4 |
| 25* | A | 45.7 | D/E | 16.1/3.5 | 5.8 | 0.8 | 26.3 |
| 26 | A | 40.1 | D/E | 16.4/3.4 | 7.6 | 0.8 | 30.3 |
| 27* | A | 49 | F | 12.2 | 7.2 | 0.8 | 29.2 |

*comparative examples

TABLE 2

Additive and catalyst contents of the TPUs prepared

| TPU | Carbodiimide ILF [% by wt.] | Irganox ® 1010 [% by wt.] | Irgafos ® PEPQ [% by wt.] | KL3-2049 [% by wt.] | Licolub ® FA6 [% by wt.] | Loxamid ® 3324 [% by wt.] | Titanium acetyl-acetonate [ppm] |
|---|---|---|---|---|---|---|---|
| 1* | 0.2 | 0.1 | — | — | 0.8 | — | 14 |
| 2 | 0.24 | 0.12 | — | — | 0.8 | — | 14 |
| 3 | 0.2 | 0.1 | — | — | 0.8 | — | 14 |
| 4* | 0.2 | 0.1 | — | — | 0.8 | — | 14 |
| 5 | 0.28 | 0.14 | — | — | 0.8 | — | 14 |
| 6 | 0.24 | 0.12 | — | — | 0.8 | — | 14 |
| 7* | 0.21 | 0.64 | 0.06 | 0.01 | — | 0.83 | 10 |
| 8 | 0.19 | 0.6 | 0.06 | 0.01 | — | 0.83 | 10 |
| 9* | 0.16 | 0.65 | 0.07 | 0.01 | — | 0.83 | 14 |
| 10 | 0.14 | 0.88 | 0.09 | 0.01 | 0.83 | — | 14 |
| 11 | 0.26 | 0.64 | 0.06 | 0.01 | — | 0.83 | 10 |
| 12* | 0.14 | 0.88 | 0.09 | 0.01 | 0.83 | — | 14 |
| 13* | 0.1 | 0.6 | 0.06 | 0.01 | 0.83 | — | 14 |
| 14* | 0.15 | 0.6 | 0.06 | 0.01 | — | 0.83 | 10 |
| 15 | 0.14 | 0.88 | 0.09 | 0.01 | 0.83 | — | 14 |
| 16* | 0.1 | 0.59 | 0.06 | 0.01 | 0.83 | — | 14 |
| 17* | 0.36 | 0.7 | 0.07 | 0.01 | 0.83 | — | 14 |
| 18* | 0.34 | 0.66 | 0.07 | 0.004 | 0.83 | — | 14 |
| 19 | 0.2 | 0.1 | — | — | 0.8 | — | 14 |
| 20 | 0.25 | 0.63 | 0.06 | 0.01 | — | 0.83 | 10 |
| 21 | 0.29 | 0.65 | 0.06 | 0.01 | — | 0.83 | 10 |
| 22 | 0.23 | 0.64 | 0.07 | 0.01 | — | 0.83 | 10 |
| 23 | 0.23 | 0.64 | 0.07 | 0.01 | — | 0.83 | 10 |
| 24* | 0.1 | 0.6 | 0.06 | 0.01 | 0.83 | — | 14 |
| 25* | 0.16 | 0.65 | 0.06 | 0.01 | 0.83 | — | 14 |
| 26 | 0.16 | 0.3 | 0.03 | 0.002 | 0.83 | — | 14 |
| 27* | 0.1 | 0.6 | 0.06 | 0.01 | 0.83 | — | 14 |

*comparative examples

TPU Film Production

The pelletized TPU materials 1 to 27 were each melted in a single-shaft extruder (Brabender Plasticorder PL 2100-6 30/25D single-shaft extruder) (metering rate about 3 kg/h; 185-225° C.) and extruded through a slot die to give a flat film in each case.

Measurement of Water Vapour Permeability (WVP) of the Composite Component by Measuring the WVP of the TPU Films Used The water vapour permeability (WVP) of the films produced was determined in a method based on DIN 53122. For this purpose, the films were stretched and fixed over a 50 ml or 100 ml vessel (diameter 46.5 mm). The vessel had been charged beforehand with 40 g of silica gel granules (diameter 1-3 mm, with indicator) which had been baked at 130° C. for 12 h. For the measurement, the vessel was conditioned in a desiccator over saturated aqueous potassium chloride solution (air humidity about 85%) and at room temperature. Every 2 h, the weight was determined until the weight increase was constant (6-8 h). In the comparison of WVP values, it should be noted that, because of temperature differences between measurements on different days, it is possible to compare only results for samples which have been tested together in the same desiccator at the same time.

Determination of the Swelling of the TPU Films

To determine the intensity of the swelling, water droplets were applied to the flat films and, after a contact time of 10 min, removed again cautiously with an absorptive cloth. The points where the water droplets had been present were then examined as to whether the flat film had lifted off the substrate (significant swelling) or not (slight swelling, if any).

Production of Injection-Moulded TPU Sheets for Measurement of the Mechanical Properties of the TPUs Used The TPU pellets were melted in an Arburg Allrounder 470 S 1000-290 injection moulding machine (30 mm screw) and shaped to S1 specimens (melt temperature about 220° C., mould temperature: 25° C., specimen size: 115×25/6×2 mm).

Measurement of Mechanical Properties

The ultimate tensile strength and elongation at break were determined by measurements in a tensile test to DIN 53504 on S1 specimens.

The most important properties of the TPU films or S1 specimens thus produced are reported in Tables 3 and 4.

The inventive examples show good water vapour permeability with simultaneously low swelling (see Table 3).

TABLE 4

Swelling, ultimate tensile strength and elongation at break

| TPU | Swelling | Ultimate tensile strength MPa | Elongation at break % |
|---|---|---|---|
| 7* | significant | 27.4 | 945 |
| 8 | none | 31.8 | 795 |
| 9* | significant | 27.7 | 1045 |
| 11 | none | 45.3 | 755 |
| 12* | moderate to significant | 19.9 | 939 |
| 13* | significant | 28.4 | 876 |
| 14* | significant | 30.1 | 880 |
| 15 | low | 31.1 | 837 |
| 16* | significant | 28.9 | 879 |
| 20 | none | 28.9 | 854 |
| 21 | none | 21.5 | 960 |
| 22 | very low | 36.6 | 835 |
| 24* | significant | 29.5 | 874 |
| 25* | significant | 25.5 | 1069 |
| 26 | low | 30.8 | 837 |
| 27* | very significant | 25.3 | 967 |

*comparative examples

The swelling of the inventive TPUs is low, with simultaneously adequate ultimate tensile strength and elongation at break (see Table 4).

The TU films used in accordance with the invention, based on comparatively inexpensive polyether polyols having adequate reactivity, exhibit good water vapour permeabilities and adequate mechanical properties with simultaneously low swelling, such that it is thus possible to provide flat composite components having the corresponding properties.

The invention claimed is:

1. A water vapour-permeable flat composite component comprising:

TABLE 3

Water vapour permeability (WVP) and swelling of the TPU films

| TPU | Moles of all CEs: moles of all polyols | Polyether polyol [pts. by wt.] | Ethylene oxide groups in components C) and D) [% by wt.] | Swelling | Film thickness [μm] | WVP [g/m²/d] |
|---|---|---|---|---|---|---|
| 1* | 2.64 | 30.5 | 0 | none | 50 | 147 |
| 2 | 2.53 | 27.3 | 22 | none | 60 | 194 |
| 3 | 2.68 | 33.5 | 27 | very low | 60 | 222 |
| 4* | 2.5 | 31 | 50 | significant | 60 | 274 |
| 5 | 2.63 | 34 | 17 | none | 50 | 179 |
| 6 | 2.65 | 44 | 22 | none | 50 | 250 |
| 7* | 2.21 | 60 | 30 | significant | 50 | 464 |
| 8 | 2.85 | 60 | 30 | none | 45 | 326 |
| 9* | 2.3 | 70 | 35 | significant | 30 | 259 |
| 10 | 2.99 | 70 | 35 | low | 70 | 147 |
| 11 | 2.19 | 50 | 25 | none | 45 | 420 |
| 12* | 2.89 | 70 | 35 | moderate to significant | 35 | 269 |
| 13* | 2.91 | 80 | 40 | significant | 35 | 299 |
| 14* | 2.85 | 70 | 35 | significant | 55 | 412 |
| 15 | 2.99 | 70 | 35 | low | 35 | 252 |
| 16* | 2.98 | 80 | 40 | significant | 33 | 292 |
| 17* | 2.79 | 24 | 24 | moderate | 35 | 163 |
| 18* | 2.8 | 28 | 28 | significant | 35 | 187 |

*comparative examples;
CEs = chain extenders (i) at least one layer not consisting of thermoplastic polyurethane; and
(ii) at least one thermoplastic polyurethane layer composed of a polyether- and polyester-based thermoplastic polyurethane; wherein the thermoplastic polyurethane is the reaction product of the components consisting of:
A) at least one organic diisocyanate;
B) at least one component having two hydroxyl groups and in each case having a number-average molecular weight of 60 to 490 g/mol as chain extender;
C) a component consisting of one or more polyether polyols each having a number-average molecular weight of 500-5000 g/mol, of which at least one polyether polyol (C1) contains ethylene oxide units; and
D) 10% to 85% by weight, based on the total weight of C) and D), of one or more aliphatic polyester polyols each having a number-average molecular weight of 500-5000 g/mol;
wherein the molar ratio of the NCO groups in A) to isocyanate-reactive groups in B), and D) is 0.9:1 to 1.2:1;
wherein the total content of ethylene oxide units in component C) is at least 5% and not more than 45% by weight, based on the total weight of components C) and D), and the number-average functionality of the sum total of all the polyols in C) and D) is 1.8 to 2.5, and wherein the content of ethylene oxide units (X in % by weight) in component C), relative to the molar ratio Y of chain extenders B) to the sum total of components C) and D), is below the value of X according to the formula X (% by weight)=7.35*Y+13.75.

2. The flat composite component according to claim 1, wherein the diisocyanate A) is selected from the group consisting of: diphenylmethane 4,4'-diisocyanate, isophorone diisocyanate, hexamethylene 1,6-diisocyanate, naphthylene 1,5-diisocyanate, dicyclohexylmethane 4,4'-diisocyanate, and mixtures of any thereof.

3. The flat composite component according to claim 1, wherein the chain extender B) is at least one aliphatic chain extender having two hydroxyl groups.

4. The flat composite component according to claim 1, wherein the chain extender B) is at least one aliphatic chain extender having two hydroxyl groups and two to eight carbon atoms.

5. The flat composite component according to claim 1, wherein the chain extender B) is at least one compound selected from the group consisting of ethanediol, propanediol, butanediol, hexanediol, 1,4-di(beta-hydroxyethyl)hydroquinone, 1,4-di(beta-hydroxyethyl)bisphenol A, and mixtures of any thereof.

6. The flat composite component according to claim 1, wherein the chain extender B) contains at least two aliphatic chain extenders each having two hydroxyl groups.

7. The flat composite component according to claim 6, wherein the at least two aliphatic chain extenders each have two hydroxyl groups and two to eight carbon atoms.

8. The flat composite component according to claim 1, wherein at least one of the polyether polyols C1) containing ethylene oxide units in component C) is one component or a plurality of components selected from the group consisting of: poly(ethylene glycol), a copolymer of ethylene oxide units and 1,2-propylene oxide units, a copolymer of ethylene oxide units and 1,3-propylene oxide units, a copolymer of ethylene oxide units and 1,3-propylene oxide units and 1,2-propylene oxide units.

9. The flat composite component according to claim 1, wherein component C) is a component mixture selected from the group consisting of: poly(ethylene glycol) and poly(1,2-propylene glycol), of poly(ethylene glycol) and poly(1,3-propylene glycol), of poly(ethylene glycol) and poly(1,3-propylene glycol) and poly(1,2-propylene glycol), poly(ethylene glycol) and a polyol formed from ethylene oxide units and from propylene oxide units, of poly(1,2-propylene glycol) and a polyol formed from ethylene oxide units and from propylene oxide units, of poly(1,3-propylene glycol) and a polyol formed from ethylene oxide units and from propylene oxide units, of poly(ethylene glycol) and poly(1,2-propylene glycol) and a polyol formed from ethylene oxide units and from propylene oxide units, of poly (ethylene glycol) and poly(1,3-propylene glycol) and a polyol formed from ethylene oxide units and from propylene oxide units, of poly(ethylene glycol) and poly(1,3-propylene glycol) and poly(1,2-propylene glycol) and a polyol formed from ethylene oxide units and from propylene oxide units.

10. The flat composite component according to claim 1, wherein the polyether polyols in component C) together have a content of ethylene oxide units of 21% to 33% by weight, based on the total weight of C) and D).

11. The flat composite component according to claim 1, wherein at least one of the polyether polyols C1) containing ethylene oxide units in component C) additionally contains propylene oxide units and has 1% to 75% primary hydroxyl end groups.

12. The flat composite component according to claim 1, wherein at least one of the polyether polyols C1) containing ethylene oxide units in component C) is formed from 30% to 99% by weight of ethylene oxide units and 1% to 70% by weight of propylene oxide units.

13. The flat composite component according to claim 1, wherein component C) does not contain any poly(tetramethylene glycol).

14. The flat composite component according to claim 1, wherein the polyester polyols in D) are present in an amount of 10% to 55% by weight, based on the total weight of C) and D).

15. The flat composite component according to claim 1, wherein the reaction is conducted in the presence of:
E) catalysts.

16. The flat composite component according to claim 1, wherein the reaction is conducted in the presence of:
F) assistants and/or additives.

17. The flat composite component according to claim 1, wherein the water vapour-permeable flat composite component comprises:
(iii) further layers composed of thermoplastic polyurethane that do not directly adjoin the layer (ii) with a flat join.

18. A roofing underlayment and exterior underlayment comprising the flat composite component according to claim 1.

* * * * *